No. 864,135. PATENTED AUG. 20, 1907.
C. A. MEZGER.
SPARK PLUG.
APPLICATION FILED DEC. 26, 1906.

Witnesses
Ethel McLaughlin.
J. K. Macdonald

Inventor
Charles A. Mezger
By his Attorney
Isaac B. Owens.

UNITED STATES PATENT OFFICE.

CHARLES A. MEZGER, OF NEW YORK, N. Y.

SPARK-PLUG.

No. 864,135.  Specification of Letters Patent.  Patented Aug. 20, 1907.

Application filed December 26, 1906. Serial No. 349,505.

*To all whom it may concern:*

Be it known that I, CHARLES A. MEZGER, of the borough of Brooklyn, city of New York, county of Kings, and State of New York, have invented certain new and useful Improvements in Spark-Plugs, of which the following is a full, clear, and exact specification, such as will enable others skilled in the art to which it appertains to make and use the same.

My invention relates to an improvement in spark plugs particularly of the type employed in what is termed the jump spark or high tension system of ignition in gas and oil engines.

The principal object of my invention is to improve the devices for effecting a hermetic connection between the porcelain insulation and the body or shell of the plug.

In carrying out my invention I construct the bushing of the plug in the usual manner and I provide a non-rotary soft metal annulus which encircles the porcelain or other insulation and bears between the inner end of the bushing and the usual enlargement on the insulation so that as the bushing is screwed home, the soft metal annulus is expanded or contracted, or otherwise caused to change its form diametrically against the enlargement on the insulation and a tight joint is thereby effected, the bushing turning freely on the annulus, and the annulus having no movement but an expanding or contracting movement longitudinal on the porcelain. With this arrangement should there be an imperfection in the porcelain such for instance as an uneven projection on the surface thereof, the annulus expands or contracts over the projection and forms a tight joint at this as well as at the other points.

Figure 1:
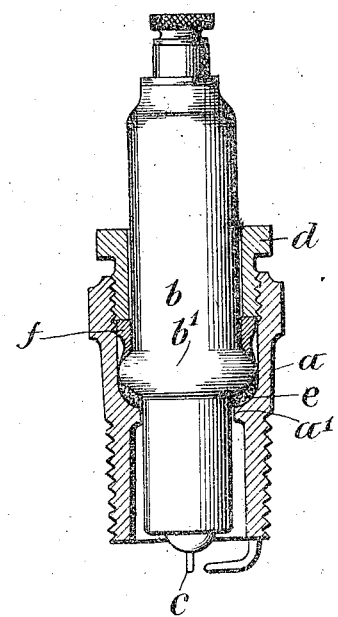
Figure 2:
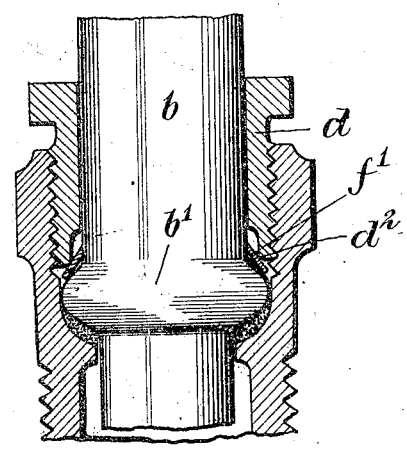
Figure 3:
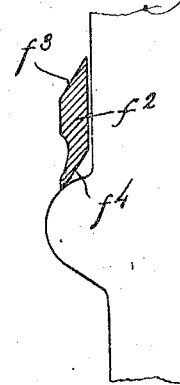

Reference is now had to the accompanying drawings, which illustrate, as an example, two practical embodiments of my invention, in which drawings:

Figure 1 is a longitudinal section of the plug in which the annulus is adapted to be expanded over the enlargement on the porcelain; Fig. 2 is a longitudinal section showing a form of the invention in which the annulus is engaged by the bushing and adapted to be crowded in around the porcelain; Fig. 3 is a section showing a slight modification in the form of the annulus, and, Fig. 4 is a section of the same when forced home.

In Fig. 1 $a$ indicates the shell or body of the spark plug as will be understood from the prior art, $b$ the insulation usually of porcelain surrounding the positive electrode $c$. The porcelain sleeve $b$ is provided within the shell $a$ with an annular enlargement $b'$ tapering at its upper and lower sides and screwing into the outer end of the shell $a$ and surrounding the porcelain sleeve $b$ is a bushing $d$. A suitable packing $e$ usually of asbestos bears between the underside of the enlargement $b'$ and an interior shoulder $a'$ on the shell $a$. $f$ indicates the annulus. This is formed of soft metal such as copper or brass and it engages the tapering upper side of the enlargement $b'$ the inner end of the bushing $d$ turning freely on the annulus. Upon assembling the parts of the plug and screwing in the bushing $d$, the bushing rotates smoothly on the annulus and crowds the same down over the enlargement $b'$ the annulus spreading or upsetting over the same and effecting a hermetic connection. Should the porcelain, as is frequently the case, have a slight unevenness or projection at the point $b'$, the soft metal bushing moving longitudinally only of the plug will inclose the enlarged portion $b'$ enveloping the unevenness and making the connection hermetic irrespective of the possible imperfections in the porcelain.

In the form of the invention shown in Fig. 2 the annulus $f'$ bears against the tapering upper side of the projection $b'$ of the porcelain $b$ and the bushing $d$ has a sharp inner edge $d^2$ which embraces and engages the annulus. Upon tightening up the bushing, its edge $d^2$ turns freely on the annulus which has no movement other than a slight crowding movement longitudinal of the plug. This operation causes the annulus to be contracted against the insulation and a hermetic joint effected.

Figure 4:
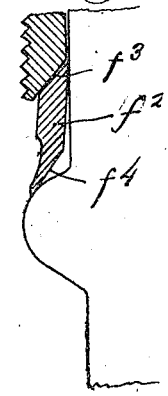

In Figs. 3 and 4, the soft metal annulus $f^2$ has a tapered lower edge substantially similar to that shown in Fig. 1, at which edge the beveled surface $f^4$ is important. The upper edge of the annulus is beveled as indicated at $f^3$, the beveled surfaces $f^3$ and $f^4$ extending from the outer to the inner surface of the annulus in the same direction. The arrangement is such that the beveled surface $f^4$ at the lower edge engages the enlargement on the porcelain while the beveled surface $f^3$ at the upper edge of the annulus is engaged and (as shown in Fig. 4) inclosed by the bushing. Before compression, this annulus $f^2$ stands slightly away from the porcelain (see Fig. 3). When, however, pressure is applied, not only does the beveled lower edge $f^4$ spread out over the taper of the porcelain, but the beveled edge $f^3$ is contracted or crowded in against the porcelain and a double packing results as is indicated in Fig. 4.

In all forms of the invention here illustrated, it will be observed that the essential principle running through the invention is the relative action of the bushing and annulus in which the turning movement is substantially confined to the bushing, the annulus being left to expand or contract or otherwise change its form diametrically by movement longitudinal of the plug, insuring envelopment, so to speak, of any projections or other imperfections in the porcelain and resulting thereby in a perfect connection.

Having thus specifically described the preferred embodiment of my invention, what I claim as new and desire to secure by Letters Patent of the United States, is:

1. In a spark plug, a shell or body, an insulation member therein with an annular enlargement, a bushing screwing into the shell and surrounding the insulation member and an annulus of relatively soft metal surrounding the insulation member at said enlarged portion, the annulus having its edges beveled in the same direction, one of such edges engaging the enlargement of the insulation and the other edge being engaged by the bushing, whereby when the bushing is screwed home, the annulus is caused to expand against the enlarged portion of the insulation and to contract against the main portion of the insulation.

2. In a spark plug a shell or body, an insulation member extending centrally through the same and formed with an annular enlargement, a bushing screwing into the shell and surrounding the insulation member and a non-rotative annulus of relatively soft metal surrounding the insulation member adjacent to said enlarged portion and engaged and partly inclosed by the bushing, said annulus being adapted under the pressure of the bushing to be contracted against the insulation member for the purpose specified.

3. In a spark plug, a shell or body, an insulation member extending centrally through the same, and having an annular enlargement, a bushing screwing into the shell and surrounding the insulation member, and a non-rotative annulus of relatively soft metal surrounding the insulation member adjacent to said enlarged portion with which annulus the inner end of the bushing has sliding engagement, whereby as the bushing is screwed home, the annulus is crowded by a non-rotative movement against the enlargement of the insulation member in a direction longitudinal of the plug and said annulus is caused to change its form diametrically for the purpose specified.

In testimony whereof, I have signed my name to this specification in the presence of two subscribing witnesses.

CHARLES A. MEZGER.

Witnesses:
ISAAC B. OWENS,
E. I. McLAUGHLIN.